United States Patent [19]

Ryan et al.

[11] 4,440,358
[45] Apr. 3, 1984

[54] TAPE TENSIONING APPARATUS AND METHOD OF ASSEMBLY

[75] Inventors: Dennis M. Ryan, San Mateo; Robert Hursey, Los Altos, both of Calif.

[73] Assignee: Ampex Corporation, Redwood City, Calif.

[21] Appl. No.: 414,234

[22] Filed: Sep. 2, 1982

[51] Int. Cl.³ .................... B65H 59/38; B65H 63/02; G03B 1/04; G11B 15/32
[52] U.S. Cl. .................................. 242/189; 242/75.3; 226/195; 360/74.3
[58] Field of Search ............... 242/189, 190, 208, 210, 242/75, 75.3, 67.1; 226/195; 360/69, 74.3, 96.5, 360/130.32

[56] References Cited
U.S. PATENT DOCUMENTS

| 3,561,691 | 2/1971 | Nichols et al. | 242/75.3 |
| 3,661,338 | 5/1972 | Becking | 242/67.1 |
| 3,851,839 | 12/1974 | Hynes | 242/147 R |
| 3,969,766 | 7/1976 | Tanaka et al. | 360/85 |

Primary Examiner—Leonard D. Christian
Attorney, Agent, or Firm—J. D. Talcott; C. M. Carman, Jr.

[57] ABSTRACT

In a magnetic tape transport, a pivoting tape tension arm has a shaft mounted in bearings in a housing that is pre-formed to be mountable on the transport in only one indexed relationship of transport and housing, and the orientation of the arm with respect to the housing is secured by means within the housing that is fully indexed during the manufacture and assemby of the arm and housing.

7 Claims, 5 Drawing Figures

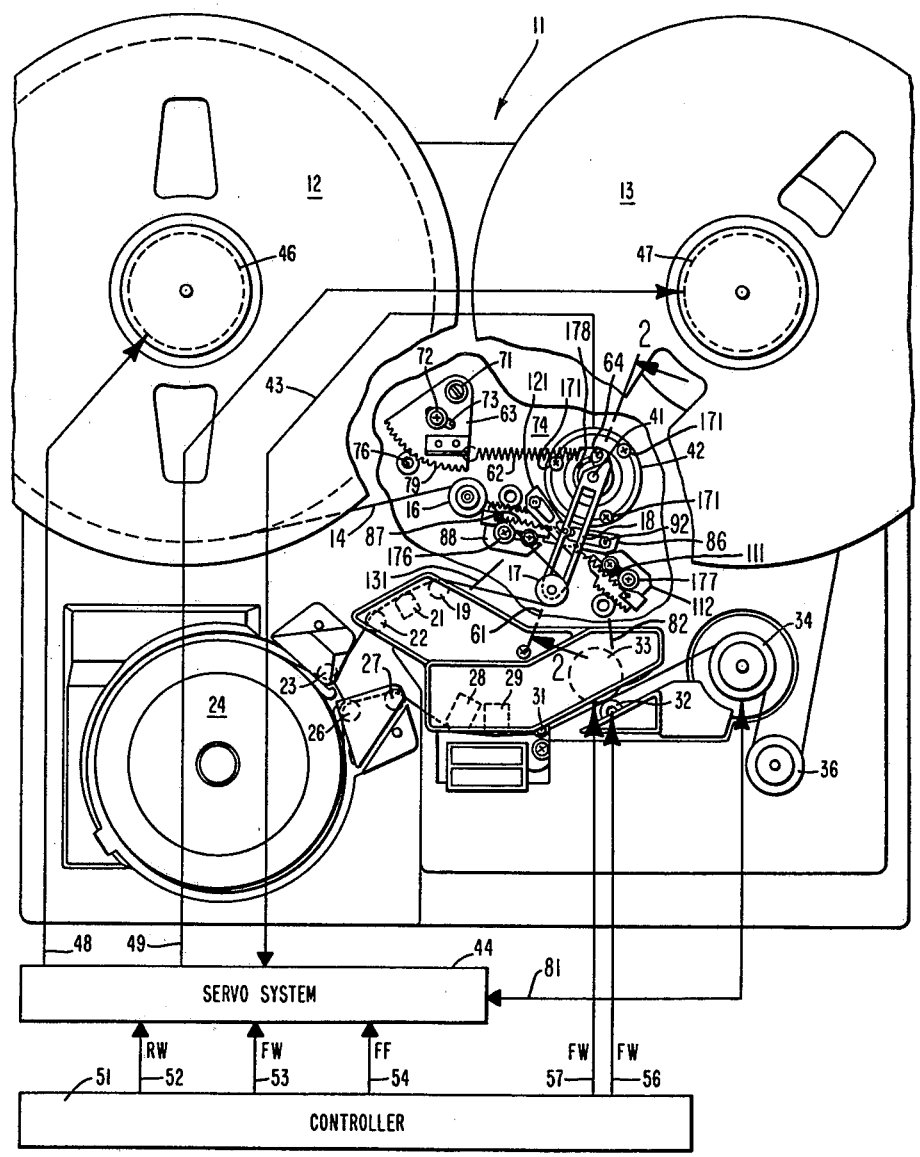
FIG_1

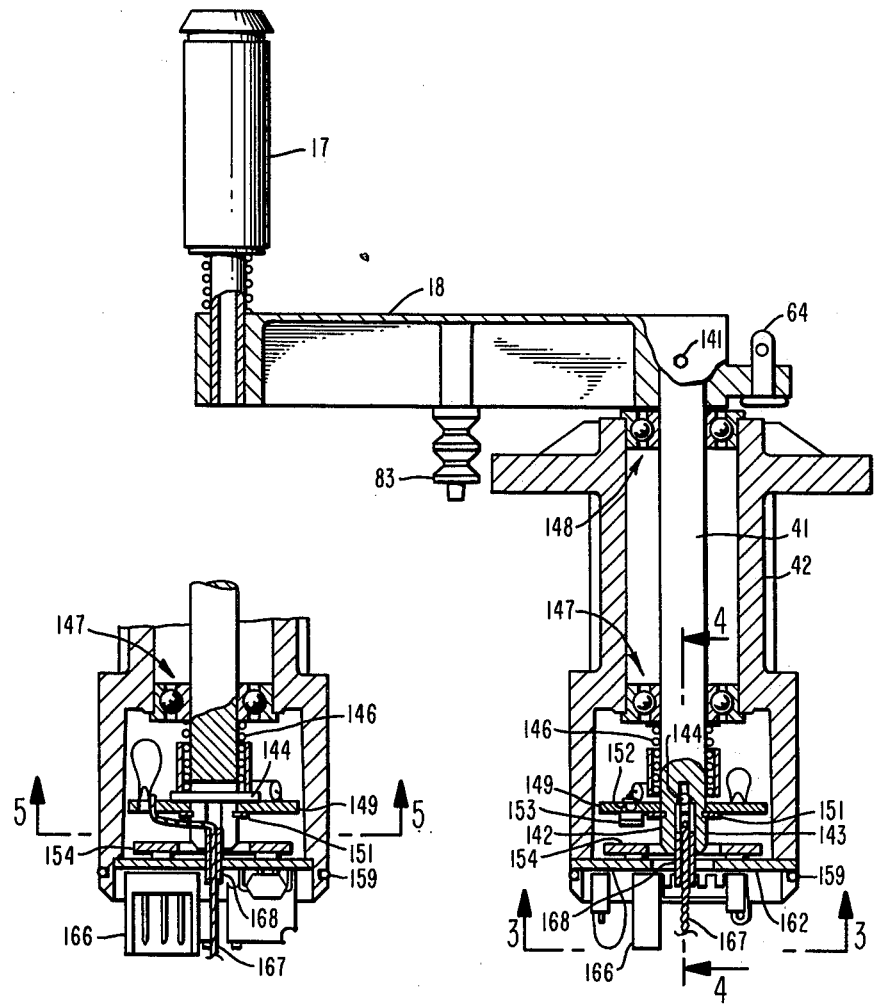
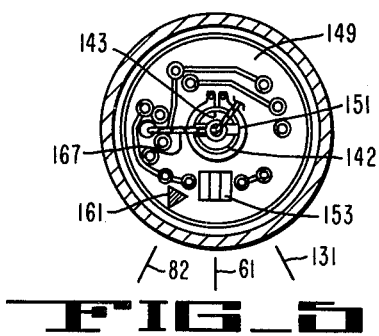
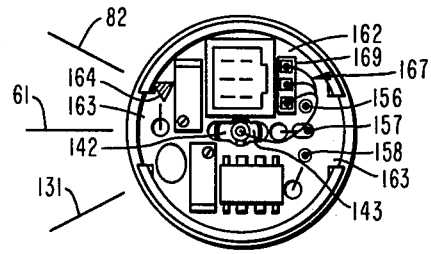

TAPE TENSIONING APPARATUS AND METHOD OF ASSEMBLY

BACKGROUND OF THE INVENTION

This invention relates to tape tensioning apparatus, and particularly to tensioning apparatus in which continous sensing of the instantaneous length of a tape loop is provided.

In the magnetic tape transport art, it is of great importance to maintain the tape tension at a predetermined value during the play and record modes in order to stabilize the actual speed of the tape across the heads. A similar but slightly less rigorous requirement obtains during the fast-forward and fast-rewind modes in order to prevent slack and throwing of the tape or breaking thereof.

To this end, it is common practice to guide the tape in a loop the length of which is sensed by means such as spring-loaded tension arms engaging the tape loop segment between tape moving and anchoring means, such as the capstan and supply reel, for play and record modes; or between the two reels, for fast forward or rewind modes. The transport control and servo system determine the length of tape to be maintained between the anchoring means, and the tension arm senses the actual length in accordance with its own rotational displacement, as the tape segment length changes, and signals this information to the control servo system; the system continously regulates the tape segment length by operating the tape moving and anchoring means until the desired length is achieved. The tension arm thus has a different position for each mode of operation, and as the arm moves from one of these positions to another, a different spring, or set of springs, is brought into play to establish the tension level desired for the corresponding mode.

In place of spring loaded tension arms, the prior art often uses tape-loop vacuum columns or linear-loop pulley systems with loop-length sensing means. Examples of various combinations of such structures may be found in e.g. U.S. Pat. Nos. 3,836,089; 3,862,724, and 3,889,895.

In such prior art apparatus, however, a common problem is that the loop-length sensing sub-assembly is not structurally integral with the tape loop-forming sub-assembly so that the two sub-assemblies must be assembled and calibrated in three operations during the factory assembly of the machine; and subsequent replacement of a defective or failed sensing means in the field requires a re-calibration of the two sub-assemblies, requiring the presence of a factory specialist.

Accordingly, it is an object of the present invention to provide a tape-loop forming and loop-length sensing apparatus that is more easily and inexpensively assembled during manufacture, and replaced or repaired in the field.

SUMMARY OF THE INVENTION

In a magnetic tape transport, a pivoting tape tension arm has a shaft mounted in bearings in a housing that is pre-formed to be mountable on the transport in only one indexed relationship of transport and housing, and the orientation of the arm with respect to the housing is secured by means within the housing that is fully indexed during the manufacture and assembly of the arm and housing.

DESCRIPTION OF THE DRAWINGS

FIG. 1 is a partly schematic illustration including a plan view of a magnetic tape transport with a portion of the top plate broken away to show the apparatus of the invention;

FIG. 2 is an enlarged cross-sectional view of the apparatus of the invention, taken on the plane of lines 2—2 of FIG. 1;

FIG. 3 is a bottom view taken on the plane of line 3—3 of FIG. 2;

FIG. 4 is an elevation cross-section taken on the plane of line 4—4 of FIG. 2; and FIG. 5 is a cross-section taken on the plane of lines 5—5 of FIG. 4.

AN APPARATUS IN WHICH THE INVENTION IS USED

An apparatus in which the invention is used is described in detail in co-pending U.S. Patent application Ser. No. 364,732 and is briefly described as follows:

Referring now to FIG. 1, there is shown a magnetic tape transport 11 including a forward supply (rewind takeup) reel 12 and a forward takeup (rewind supply) reel 13 upon which is wound a magnetic tape 14 running in forward play-record mode from the supply reel 12 around a guide roller 16, thence around a roller 17 that is mounted at the tip of a pivoting tension arm 18, thence to a guide 19, transducing head 21, guides 22 and 23, a helical tape scanning drum 24, guides 26,27 heads 28,29, a guide 31, capstan 32, pinch roller 33, tachometer 34, guide roller 36, and thence to takeup reel 13.

The tension arm 18 is pivotally mounted on the shaft 41 of a rotational-position sensing device 42, which contains the apparatus of the invention. The device 42 transmits a signal schematically illustrated by arrow 43 to a servo system 44, which may be of any type among many well known in the art, and which functions in a well known manner to regulate the length of the tape segment between reel 12 and capstan 32 (in the play-record mode), or between the two reels 12, 13 in fast forward and rewind modes, as by means of control signals to the respective reel motors 46, 47 illustrated by arrows 48,49. The mode commands are initiated by a controller 51 which may also be of any well known type, and these command signals are illustrated by arrows 52,52 and 54 for rewind (RW), play-record modes (i.e., forward, FW), and fast forward (FF). The controller also provides a signal 56 to the capstan 32 and a signal 57 to the pinch roller 33 to operate these elements during the play-record modes only.

To maintain the arm 18 at the desired neutral position 61 for play mode, a helical tension spring 62 is extended from an adjustable mounting bracket 63 to a post 64 on an extending end of arm 18.

In play operation, the apparatus 42 of the present invention senses the rotational position of the arm 18, transmits the position signal 33 to the servo system 44, and the servo transmits the signals 48,49 and 56,57 to the reel motors 46,47 and capstan-pinch-roller assembly 32,33 to alter the length of the tape segment between reel 12 and capstan 32, so that the arm 18 is pulled by tape 14 to the play position shown in FIG. 1. At this position and for a substantial range (e.g., about 10 degrees) on either side, the tape tension established by pin 62 is essentially constant, e.g. about 3.5 oz.

The desired play tension may be accurately set during operation of the machine by adjustment of the bracket 63, as described in detail in copending U.S. Patent application Ser. No. 364,726. Briefly, bracket 63 is mounted for pivoting motion on a pin 71 and clamped in the desired position by means of a bolt 72 projecting through an arcuate slot 73 and threaded into a mounting plate 74 of the machine 11. When bolt 72 is loosened, the bracket may be rotated as by means of a gear toothed tool (not shown) which has a projection fitting into a reference hole 76 in plate 74, and the teeth of which engage an arcuate row of gear teeth 77 on bracket 63.

When it is desired to initiate a fast forward mode, controller 51 sends commands 54, 56,57, 48 and 49 to or through the servo 44, and to the capstan, pinch roller and reels, to retract the pinch roller, inactivate the capstan and cause the reels to move the tape forward at high speed under control of the servo; and the actual tape speed is sensed by tachometer 34, which transmits a speed sensing signal 81 to the servo (also in the play and rewind modes). The servo also causes an increased length of tape to be defined in the segment between the reels, so as to permit arm 18 to rotate counter-clockwise toward the fast forward neutral position 82. At about ten degrees from the forward neutral position 82, a roller pin 83 on the arm encounters an arcuate recess in a link member and moves the link member in conjoint motion in substantially the same direction until the device 42 of the invention signals the servo 44 that the arm is in its correct position 82. In this position the arm is loaded not only by spring 62, but also by an opposing auxiliary spring 87 distended between linkage 86 and adjustable bracket 88 mounted on mounting plate 74.

When the spring 87 first becomes additionally stressed by pin 83, the result is a sudden (nearly instantaneous) discrete drop in the spring loading of arm 18, since the moment applied by spring 87 is opposed to that of spring 62; and since spring 87 is already prestressed by post 92, the slope of the tension-rotation curve for fast forward mode can be made to be much steeper that that of the play mode, which is desirable for better servo system operation.

For rewind mode, a similar spring 111 is preloaded in an aiding direction with respect to spring 62, and is stretched between a sliding adjustable bracket 112 and a link 121, a mirror image of link 86. The spring 111 and link 121 are mounted to add the spring force of spring 111 to that of spring 62, and the resulting action, under commands 52,56 and 57 from controller 51, produces movement of arm 18 to a rewind position 131, and produces a sudden discrete jump in tension to a new tension level, (e.g., 9.5 oz. nominal) for rewind mode.

Further details of the operation of the above-described apparatus in which the invention is used may be formed in the above-referenced U.S. Patent application Ser. No. 364,732.

DESCRIPTION OF THE PREFERRED EMBODIMENTS OF THE INVENTION

It will be seen from the above description that the physical environment in which the invention is used is very crowded, so that prior-art structures of the type providing photo-electric or other sensings of the position of the tip 17 of the arm 18 would be difficult to install and to calibrate or adjust. Therefore, the present invention comtemplates the entire position-sensing apparatus, and most of the electronic circuits therefor, to be mounted entirely within the housing 42 and to be field-replaceable as a unit with housing 42, and with arm 18 and/or shaft 41.

To this end (see FIGS. 2-5), the arm 18 is pinned to shaft 41 as by a set screw 141 aligned in the same axial plane in which the other end of the shaft is split to present two bifurcations 142, 143; thus the arm is indexed with respect to the plane of the split, a circuit-mounting board 149, to which is soldered an indexing cross-pin 144, is fitted on the shaft with the pin 144 in the split between bifurcations 142, 143. Thus the board is also indexed with respect to the arm 18. The board is retained as a means of a snap-ring 151 fitted into a corresponding circumferential groove in the shaft.

Upon the upper face of board 149 is mounted a light-emitting diode (LED) 152 which shines though a grating type lens 153, which in turn concentrates the light from LED 152 into a radial line upon a toroidal photo-potentiometer element 154 that is mounted in fixed relation to the housing 42. The element 154 has three leads 156, 157 and 158, the lead 157 being in common and the leads 156, 158 each acting with lead 157 to present signals respectively representing the greater and lesser circumferential dimensions of the two paths from the illuminated radius of the element 154 to the leads 156, 158. These signals constitute the signal 43 that is constantly sent to the servo 44 as an indication of the rotational position of the arm 18.

To assure the easy assembly of the apparatus, the board 149 is assembled on the shaft 41 with the diode 152 and lens 153 orthogonally related to the length of cross-pin 144 and the board is provided with an index mark 161, in one quadrant adjacent to diode 152 so that the assembler can easily correlate the quadrantal orientation of this board with that of a second board 162 to which the photo-potentiometer element 154 is epoxy-cemented. This board 162 is keyed as by radial projections 163 to corresponding keyways formed in the housing 42, so as to have the common terminal 157 of the potentiometer in the same axial plane as the central arm position 61, and an index mark 164 in the same quadrant as that of mark 161 for facilitating alignment and orientation of the two boards 149, 162. Board 162 is retained as by means of a retaining ring 159 mounted in a suitable circumferential recess of housing 42 (see FIG. 2).

Most of the amplifier and other circuit elements needed for the sensing system find sufficient room for mounting on the two boards 149, 162. The leads for fixed board 162 are drawn to a pronged connector 166, and the leads 167 from the rotating board 149 are drawn between the shaft bifurcations 142, 143 and through an axially aligned protective sleeve 168 to another connector 169.

The arm 18, LED 152 and photo-potentiometer 154 are now fully and accurately intra-indexed as a complete sub-assembly, and since the housing 42 is mounted on the plate 74 of the machine as by means of three angularly equispaced (120 degrees) bolts 171, there remains only the problem of assuring that the subassembly be mounted in its correct orientation and not 120 degrees off, in one direction or the other.

It will be noted that the transport has two stop elements 176, 177 for the arm 18, which limit the arm to a pivoting range of 54 degrees. Furthermore, the housing 42 has a roll pin 178 projecting into the rotational paths of both the arm and its cantilevered extension for pin 64, and at just the right spot to limit the rotational range of the arm to about 54 degrees in either direction from the common terminal 157 of the potentiometer.

Thus, it is only necessary to attach the housing 42 as by bolts 171 with the roll pin 178 aligned with the leftmost position for a bolt 171, and with the arm 18 falling between the two stops 176–177.

Thus, the apparatus of the invention can be surely and easily assembled in the transport, either at the factory or in the field, as by relatively unskilled operators acting on simple instructions.

As for assembly in the factory, the steps are as follows:

mounting shaft 41 in housing 42 with arm 18 attached to the shaft by means of set-screw 141; mounting circuit board 149 on the shaft with key element 144 in the shaft keyway between bifurcations 142–143 and the diode 152 in its predetermined indexed relation to the arm and in its preferred orientation with respect to the keyway;

It will be apparent that other space-transfering-signal generating means (e.g., a magnetic element) may be used in place of diode 152, together with suitable signal receiving and transducing means (e.g. a Hall-effect transducing element) in place of potentiometer 154.

What is claimed is:

1. Field-replaceable tension-sensing apparatus for a tape transport, comprising:
    a housing adapted for detachable attachment to said transport on said tape path thereon and between a pair of tape-engaging and path-determining means for said tape;
    tape engaging and loop-inducing means extending from said housing for engaging said tape between said path-determining means and for inducing said loop in said tape with the length of said loop varying with said tension of said tape in said loop, said loop-inducing means being arranged for motion in accordance with the varying length of said loop as an indication of said tape tension; and
    means mounted in said housing for sensing the motion of said loop-inducing means with respect to said housing and for producing a signal representing said motion and the tension of said tape;
    whereby said apparatus may be attached to said transport without the need for subsequent calibration.

2. Field-replaceable tension-sensing apparatus for a tape transport, comprising:
    a housing adapted for detachable attachment to said transport on said tape path thereon and between a pair of tape-engaging and path-determining means for said tape;
    tape engaging and pivoting arm means extending from said housing and mounted for rotation on a shaft journalled in said housing, said arm having a guide post extending from the extending and thereof for engaging said tape between said path-determining means and for inducing said loop in said tape with the length of said loop varying with said tension of said tape in said loop, said pivoting arm means being arranged for pivoting motion in accordance with the varying length of said loop as an indication of said tape tension; and
    means mounted in said housing for sensing the motion of said arm means with respect to said housing and for producing a signal representing said motion and the tension of said tape;
    whereby said apparatus may be attached to said transport without the need for subsequent calibration.

3. Field-replaceable tension-sensing apparatus for a tape transport, comprising:
    a housing adapted for detachable attachment to said transport on said tape path thereon and between a pair of tape-engaging and path-determining means for said tape;
    tape-engaging pivoting-tension-arm means extending from said housing for engaging said tape between said path-determining means and for inducing said loop in said tape with the length of said loop varying with said tension of said tape in said loop, said arm being mounted on a shaft in said housing for pivoting motion in accordance with the varying length of said loop as an indication of said tape tension;
    a circuit board attached to and moving with said shaft within said housing for carrying electronic elements and a space-traversing-signal generating means mounted on said circuit board in predetermined indexed relation with said arm;
    means for receiving and transducing said space-traversing signal fixedly mounted in predetermined indexed relation to and within said housing and in predetermined spaced relation to said generating means;
    said housing being adapted for attachment to said transport in predetermined indexed relation therewith; and
    said space-traversing-signal receiving and transducing means being mounted in predetermined indexed relation to said housing and being adapted to produce a tension-representing signal as an indication of the degree to which said signal generating means departs from a predetermined indexed relation with said housing;
    whereby said apparatus may be attached to said transport without the need for subsequent calibration.

4. Field-replaceable tension-sensing apparatus for a tape transport, comprising:
    a housing adapted for detachable attachment to said transport on said tape path thereon and between a pair of tape-engaging and path-determining means for said tape;
    a tape-engaging tension arm mounted for pivoting motion on a shaft in said housing and extending from said housing for engaging said tape between said path-determining means and for inducing said loop in said tape with the length of said loop varying with said tension of said tape in said loop, said loop-inducing means being arranged for motion in accordance with the varying length of said loop as an indication of said tape tension;
    a first circuit board attached to and moving with said shaft for carrying electronic elements, and a space-traversing-signal generating means mounted on said circuit board in predetermined indexed relation with said arm;
    means for receiving and transducing said space-traversing signal mounted on a second circuit board fixedly attached to said housing in predetermined spaced relation to said generating means; in predeterminded indexed relation to said housing and being adapted to produce a tension-representing signal as an indication of the degree to which said signal generating means departs from a predetermined indexed relation with said housing;
    said signal generating means including a light emitting diode and a grating lens for focussing said light into a substantially radially linear zone upon said receiving and transducing means;

said receiving and transducing means being a photopotentiometer element of toroidal shape mounted coaxially with said shaft and adapted to produce said tension signal as a indication of the rotational position of said light zone with respect to said housing;

said housing being adapted for attachment to said transport in predetermined indexed relation therewith; and whereby the tension signal always represents the rotational position of said arm with respect to said housing, and, when said housing is mounted on said transport, the position of said arm with respect to said transport as well; and whereby said apparatus may be attached to said transport without the need for subsequent calibration.

5. The apparatus recited in claim 4, wherein:

said potentiometer element is mounted on a fixable circuit board having a non-circular circumference conforming to a similar interior circumference of said housing;

said fixable circuit board has an index mark indicating a preferred orientation of said fixable board with respect to said housing;

said shaft has a keyway formed therein to indicate in part a preferred orientation of said shaft and diode;

said first-named circuit board having a key element mounted thereon and seating in said keyway in said shaft and an index mark thereon indicating a preferred orientation thereof with respect to said potentiometer; and said arm being attachable to said shaft by means of a set-screw threaded into corresponding hole in said arm and shaft with said arm in a preferred orientation with respect to said shaft keyway.

6. A method for assembling a tension sensing apparatus for a tape transport, comprising:

mounting said shaft in said housing with said arm attached to said shaft by means of said set-screw;

mounting said first-named circuit board on said shaft with said key element in said shaft keyway and said diode in said predetermined indexed relation to said arm and in said preferred orientation with respect to said keyway;

mounting said fixable circuit board in said housing as by fitting said non-circular circumferences of said fixable board and housing together with said index marks in alignment; and securing said fixable board in said housing.

7. Apparatus as recited in claim 3, wherein said space-traversing-signal generating means is a magnetic element and said means for receiving and transducing said space-traversing signal is a Hall effect transducer.

* * * * *

UNITED STATES PATENT AND TRADEMARK OFFICE
CERTIFICATE OF CORRECTION

PATENT NO. : 4,440,358

DATED : April 3, 1984

INVENTOR(S) : Dennis M. Ryan and Robert Hursey

It is certified that error appears in the above-identified patent and that said Letters Patent is hereby corrected as shown below:

Column 2, line 47, "arrows 52, 52" should read --arrows 52, 53--;
Column 3, line 41, "that that" should read --than that--;
Column 3, line 55, "may be formed" should read --may be found--;
Column 5, line 17, "space-transfering" should read --space-traversing--;
Column 8, Claim 6, should read as follows --
A method for assembling a tension sensing apparatus for a tape transport, comprising:
mounting a shaft in a housing with an arm attached to said shaft by means of a set-screw;
mounting a first circuit board on said shaft with a key element of said board in a shaft keyway and a diode of said board in a predetermined indexed relation to said arm and in a preferred orientation with respect to said keyway;
mounting a second fixable circuit board in said housing as by fitting non-circular circumferences of said fixable board and housing together with index marks of said fixable board and housing in alignment; and
securing said fixable board in said housing.--

Signed and Sealed this

Fourth Day of March 1986

[SEAL]

Attest:

DONALD J. QUIGG

Attesting Officer

Commissioner of Patents and Trademarks